US010508695B2

(12) United States Patent
Bauman et al.

(10) Patent No.: US 10,508,695 B2
(45) Date of Patent: Dec. 17, 2019

(54) WEDGE CLUTCH WITH CENTRIFUGAL LIFTOFF

(71) Applicant: SCHAEFFLER TECHNOLOGIES AG & CO. KG, Herzogenaurach (DE)

(72) Inventors: Jeremiah Bauman, Orrville, OH (US); Michael Hodge, Creston, OH (US); James Copeland, Massillon, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 53 days.

(21) Appl. No.: 15/827,455

(22) Filed: Nov. 30, 2017

(65) Prior Publication Data

US 2019/0162247 A1    May 30, 2019

(51) Int. Cl.
*F16D 41/063*    (2006.01)
*F16D 41/06*    (2006.01)

(52) U.S. Cl.
CPC .................. *F16D 41/063* (2013.01)

(58) Field of Classification Search
CPC .............. F16D 41/063; F16D 41/06
See application file for complete search history.

(56) References Cited

U.S. PATENT DOCUMENTS

| 2,150,715 | A | * | 3/1939 | De Falco | F16D 41/063 192/45.1 |
| 3,202,251 | A | * | 8/1965 | Fulton | F16D 41/063 192/104 B |
| 9,732,808 | B2 | | 8/2017 | Davis | |
| 10,094,432 | B2 | * | 10/2018 | Lee | F16D 41/063 |
| 2010/0096236 | A1 | | 4/2010 | Ando | |
| 2013/0341147 | A1 | | 12/2013 | Buchanan | |
| 2014/0041982 | A1 | | 2/2014 | Chien | |
| 2016/0341262 | A1 | | 11/2016 | Ramsey | |

FOREIGN PATENT DOCUMENTS

CN    202371056 U    8/2012

* cited by examiner

*Primary Examiner* — Charles A Fox
*Assistant Examiner* — Tinh T Dang
(74) *Attorney, Agent, or Firm* — Brooks Kushman P.C.

(57) ABSTRACT

A wedge one-way clutch is provided for selectively transmitting torque between two components in one direction, and selectively locking rotation in another direction. The clutch has an inner race with a groove defined about its outer surface. The clutch has an outer race disposed radially outwardly from the inner race. The outer race has a sloped surface as part of a pocket. A wedge segment rests in the pocket. The wedge segment is moveable within the pocket, wherein the wedge segment has a taper or chamfer at its inner surface that engages with the groove in a slideable fashion. The wedge may also have a sloped surface that mates with and slides along the sloped surface of the outer race. The wedge can slide along the sloped surface, and along the inner race, so that the wedge wedges between the outer and inner races to lock them together.

17 Claims, 2 Drawing Sheets

WEDGE CLUTCH WITH CENTRIFUGAL LIFTOFF

TECHNICAL FIELD

The present disclosure relates to wedge clutches for coupling two or more components. More particularly, the wedge clutch of this disclosure has structure that allows for liftoff of components when subjected to centrifugal forces.

BACKGROUND

A vehicle powertrain may include a wedge clutch for coupling an input shaft to an output shaft. The wedge clutch includes an inner race connected to one of the shafts and an outer race connected to the other of the shafts. A wedge element is radially disposed between the inner and outer races and is configured to engage the inner and outer races when the clutch is locked to transmit power from the input shaft to the output shaft.

U.S. Pat. No. 9,732,808 discloses one embodiment of a wedge clutch known in the art.

SUMMARY

In one embodiment, a wedge clutch includes an inner race extending about a central axis and having an outer surface defining a groove. An outer race extends about the axis and is rotatable relative to the inner race. The outer race has an inner surface that defines a plurality of pockets. Each pocket has a ramped surface that faces the axis and is ramped relative to the outer surface of the inner race. A plurality of wedge segments are disposed within the pockets. Each wedge segment has a ramped outer surface contacting a respective ramped surface of one of the pockets in a sliding engagement to enable relative circumferential movement between the wedge segments and the outer race. Each wedge segment has a tapered inner surface disposed within the groove of the inner race.

The pockets of the outer race may also define a curved wedge-receiving surface. The wedge segments each may have a curved engagement surface at one end that is engageable with the wedge-receiving surface.

In another embodiment, a wedge clutch includes an inner race extending about an axis and having an outer surface. An outer race is concentric with the inner race and has an inner surface defining a pocket. The pocket has a ramped surface facing the axis. A gap exists between the ramped surface and the outer surface of the inner race. The gap narrows along a circumferential direction. A wedge is disposed in the pocket and has an inner surface in sliding engagement with the outer surface of the inner race. The wedge further includes an outer surface that is ramped with respect to the inner surface of the wedge. Circumferential movement of the wedge relative to the pocket wedges the wedge into a narrowing portion of the gap to lock the inner race with the outer race.

According to another embodiment, a one-way clutch includes an inner race extending about an axis and having an outer surface. An outer race is concentric with the inner race and has an inner surface that defines a pocket. The pocket has a ramped surface facing the axis. The ramped surface is angled toward the outer surface of the inner race along a circumferential direction about the axis. The pocket further has a curved wedge-receiving surface. A wedge segment is disposed in the pocket. The wedge segment has a ramped outer surface in sliding engagement with the ramped surface of the pocket. The wedge segment further has a curved engagement surface and a toe at an opposite end from the curved engagement surface. The wedge segment is slidable along the outer race between (i) a locked position in which the engagement surface is spaced from the wedge-receiving surface, and the toe is wedged between and contacting both the ramped surface of the outer race and the outer surface of the inner race to lock the outer race to the inner race, and (ii) an unlocked position in which the engagement surface contacts the wedge-receiving surface and the toe is unwedged from between the ramped surface of the outer race and the outer surface of the inner race to unlock the outer race and inner race.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It should be understood that directional terms as used herein are with reference to the orientation of the wedge clutch as shown in the Figures. For example, reference to "inner" and "outer" or the like refer to the orientation of FIG. 1A in which "inner" and "outer" is relative to a central axis passing through the center of the inner and outer races, about which the races rotate. An outer surface may be referred to as a circumferential surface or an outer circumferential surface.

Figure 1:
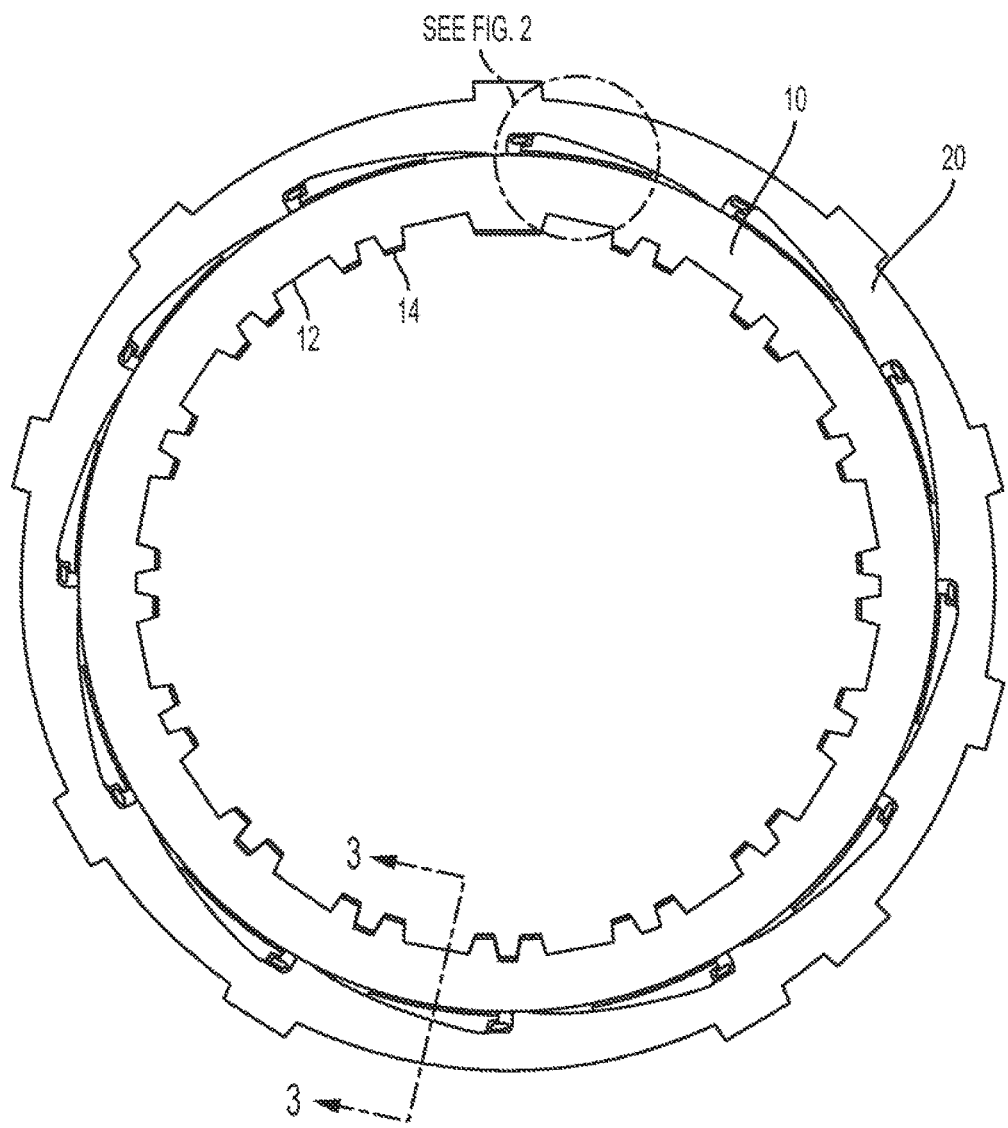
FIG. 1 is a front plan view of a wedge clutch according to one embodiment of this disclosure.
Figure 2:
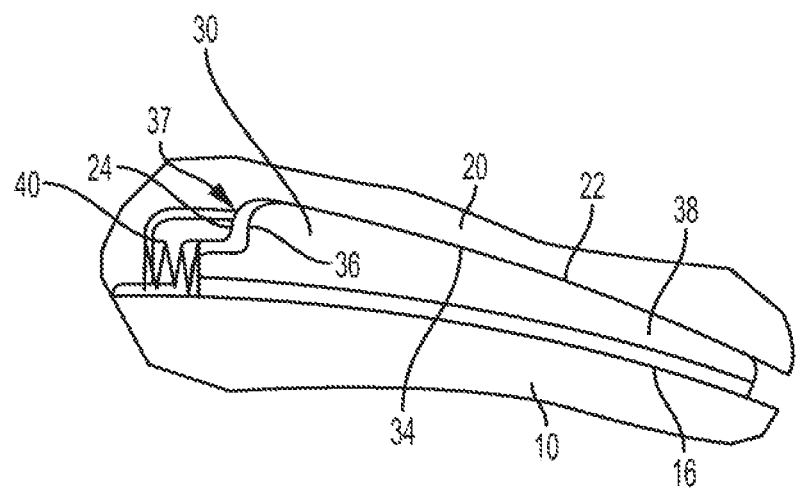
FIG. 2 is an enlarged view of region "A" of FIG. 1.
Figure 3:
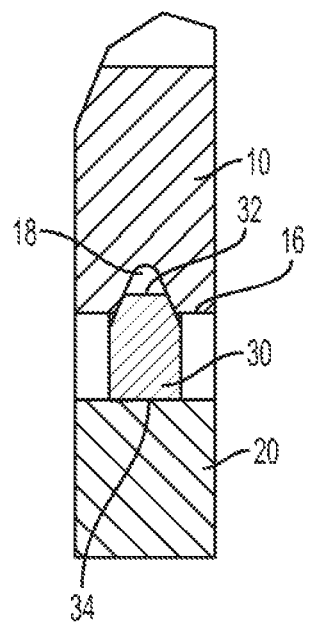
FIG. 3 is a cross-sectional view of a portion of the wedge clutch taken along line C-C of FIG. 1.

FIG. 1 illustrates a wedge clutch 1 according to one embodiment of this disclosure, FIG. 2 shows an enlarged view of region of the wedge clutch 1 of FIG. 1, and FIG. 3 shows a cross-sectional view of the wedge clutch 1 taken along line 3-3 in FIG. 1. The wedge clutch 1 includes an inner race 10 (also referred to as a hub), an outer race 20 (also referred to as a carrier), and a wedge segment 30 (also referred to as a wedge plate) radially disposed between the inner race 10 and the outer race 20. The inner race 10, the outer race 20, and the wedge segments 30 may all be concentric with each other and supported about a common axis. The wedge segments 30 are configured to move radially to rotational lock the inner race 10 with the outer race 20, in at least one direction, when the clutch is engaged and to allow independent rotation between the inner race 10 and outer race 20 when the clutch is disengaged.

The wedge clutch 1 may be a one-way clutch that selectively locks the inner race to the outer race in one direction when the clutch is engaged and allows rotation of the outer race relative to the inner race in at least the other direction. In the illustrated embodiment, the wedge clutch 1 is a one-way clutch that locks the outer race 20 against rotation in a first rotational direction (e.g. counter-clockwise in the view of FIG. 1A) when the clutch 1 is engaged (also known as locked), and allows free rotation of the outer race 20 in a second direction (e.g., clockwise in the view of FIG. 1A) when the clutch 1 disengaged (also known as unlocked).

The inner race 10 may have an inner surface 12 defining splines 14 or surface features that are received in grooves formed in a central shaft (not shown) so that the inner race 10 is locked with the central shaft. In one embodiment, the central shaft is a rotationally-fixed housing so that the inner race 10 does not rotate. The outer race 20 rotates about the fixed inner race 10. The housing is not shown, but may be a transmission housing, a differential housing, a power transfer unit (PTU) housing, or any other housing found in vehicle powertrains.

The inner race 10 may have an outer surface 16 that defines a groove 18 extending radially inward from the outer surface 16. The groove 18 is sized and configured to receive a corresponding tapered inner edge or chamfer of the wedge segment, as described below.

A plurality of the wedge segments 30 are provided about the outer surface 16 of the inner race 10. In the illustrated embodiment, twelve wedge segments 30 are provided, however, more or less than twelve wedge segments can be provided for particular design application. Each wedge segment 30 is separate and distinct from one another; the wedge segments are disconnected and separate components with respect to each other. However, in another embodiment not shown, the wedge segments are connected to one another, via a cage for example. While this disclosure refers to each component as a wedge segment, the term "wedge plate" can also refer to one of these wedge segments or an array of wedge segments about the inner race collectively.

Each wedge segment 30 has an inner surface 32 that is tapered or chamfered. As shown in FIG. 3, the groove 18 of the outer surface 16 of the inner race 10 is configured and sized to receive the chamfered inner surface 32 of the wedge segments 30. The chamfered inner surface 32 can slide circumferentially about the inner ring along the groove 18. This allows for, during operation, the inner race 10 to remain stationary while the wedge segments 30 and outer race 20 rotate about the inner race 10.

Each wedge segment 30 has an outer surface 34 that is circumferentially ramped. In other words, along the outer surface 34 the outer surface 34 changes in its radial distance from the central axis. The outer race 20 has a corresponding inner surface 22 that is ramped to match the profile of the outer surface 34. Said another way, the outer race 20 may include pockets with interior surfaces that are ramped to accommodate the profile of the wedge segments 30. This allows the outer surface 34 of the wedge segments 30 to slide along the inner surfaces of the outer race 20 as the wedge segments 30 rotate circumferentially with respect to the outer race 20. The inner surface 22 is shaped such that the wedge segments 30 are bound both radially and circumferentially by the inner and outer races. Because the distance between the inner and outer races decreases along the inner surface 22, the wedge segments 30 are wedged between the inner and outer races as they are forced in one circumferential direction (e.g., clockwise in FIGS. 1-2.)

In short, the wedge segments 30 have both an inner surface that is chamfered, and an outer surface that has a ramped profile. This allows the particular operation of the wedge clutch as described herein according to embodiments.

According to one embodiment, during operation, the inner race 10 remains stationary while the outer race 20 and wedge segments 30 rotate about the inner race 10. When the wedge clutch 1 is static, a spring 40 biases the wedge segments 30 into a wedged engagement between the inner and outer races (e.g., clockwise in FIGS. 1-2). The spring 40 may be mounted in a corresponding pocket within the outer race. The frictional contact between groove on the inner race and the ramp angle on the outer race provides the locking function of the clutch. This wedged engagement keeps the clutch in its locked or engaged position, and the locked wedge clutch prevents movement of the outer race 20 in the other direction (e.g., counter-clockwise in FIGS. 1-2) relative to the wedge segments. The springs 40 provide a zero lash during engagement.

As the outer race 20 and wedge segments 30 begin rotating and/or increase their rotational speed (e.g., clockwise in FIGS. 1-2), the wedge segments 30 lift off tangentially to the ramp profile of the inner surface 22 of the outer race 20. In other words, the centrifugal force due to rotation of the wedge segments 30 and outer race 20 overcomes the biasing forces from the springs 40 and forces the wedge segments 30 radially outward. This causes the wedge segments 30 to slide along the inner surface 22 in a relative direction opposite to rotation, compressing the springs 40. This provides no additional drag torque from the clutch when it is freewheeling at high speeds.

The outer race 20 is also provided with a pivot feature that secures the wedge segment into position after the wedge segments 30 have lifted off during high rotational speeds. In one embodiment, the pivot feature is provided with the presence of a curved wedge-receiving surface 24 that receives or engages with a corresponding curved engagement surface 36 of the wedge segments. As shown in FIG. 2, the receiving surfaces 24 are sized and shaped to receive and mate with the corresponding engagement surfaces 36 of a corresponding wedge segment 30 when the wedge segments 30 have traveled to their extend circumferentially (e.g., counter-clockwise in FIGS. 1-2) relative to the outer race 20.

In the illustrated embodiment, the receiving surface 24 and the engagement surface 36 are each S-shaped. Each surface includes a portion extending in the radial direction, followed by a turn and a portion that extends in the circumferential direction, followed by another turn and another portion extending in the radial direction. When the wedge segments 30 are forced against the biasing spring, the wedge segments 30 would otherwise be somewhat unlocked and otherwise free to wiggle. However, the engagement of the surfaces 24, 36 stabilizes such movement. The engagement of the surfaces 24, 36 provides a pivot point 37, and the centroid of the wedge segment works in conjunction with the pivot point 37 during high speeds to force the toe 38 of the wedge segment 30 against the outer race 20. In other words, the wedge segments 30 pivot about the pivot point 37 where the receiving surface 24 of the outer race 20 contacts the engagement surface 36 of the wedge segment 30, and the wedge segment 30 is able to rock or pivot such that the toe 38 is forced against the outer race 20 via the centrifugal force during high speeds. This prevents or reduces lash and noise, vibration and harshness (NVH) issues that might otherwise occur.

Although this disclosure describes the outer surface of the inner race as having the groove, and the inner surface of the wedge as having the tapered surface, it should be understood that these components can be reversed—the inner race may have a chamfered protrusion and the wedge may have a groove on its inner surface configured to receive the protrusion of the inner race.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A wedge clutch comprising:
    an inner race extending about a central axis and having an outer surface defining a groove;
    an outer race extending about the axis and rotatable relative to the inner race, the outer race having an inner surface defining a plurality of pockets, each pocket having a ramped surface that faces the axis and is ramped relative to the outer surface of the inner race; and
    a plurality of wedge segments disposed within the pockets, each wedge segment having a ramped outer surface contacting a respective ramped surface of one of the pockets in a sliding engagement to enable relative circumferential movement between the wedge segments and the outer race, and each wedge segment having a tapered inner surface disposed within the groove of the inner race;
    wherein the pockets of the outer race each define a curved wedge-receiving surface extending from the ramped surface of the pocket, and the wedge segments each have a curved engagement surface at one circumferential end thereof configured to contact a respective one of the curved wedge-receiving surfaces.

2. The wedge clutch of claim 1, wherein the wedge segments are configured to slide along the groove of the inner race between a locked position in which the curved engagement surface is spaced from the curved wedge-receiving surface, and an unlocked position in which the curved engagement surface contacts the curved wedge-receiving surface.

3. The wedge clutch of claim 1, further comprising a plurality of springs each coupled to a respective one of the wedge segments, each spring biasing its respective wedge segment such that the curved engagement surface is spaced from the curved wedge-receiving surface.

4. The wedge clutch of claim 1, wherein the ramped surfaces of the pockets define a gap between the ramped surfaces and the outer surface of the inner race, wherein the gap narrows in a circumferential direction.

5. The wedge clutch of claim 4, wherein the wedge segments have a toe that narrows in the circumferential direction and is configured to wedge within a narrowed portion of the gap.

6. The wedge clutch of claim 1, wherein the curved wedge-receiving surfaces forces opposing ends of the wedge segments against the outer race.

7. A wedge clutch comprising:
    an inner race extending about an axis and having an outer surface;
    an outer race concentric with the inner race and having an inner surface defining a pocket, the pocket having a ramped surface facing the axis, wherein a gap exists between the ramped surface and the outer surface of the inner race, the gap narrowing along a circumferential direction: and
    a wedge disposed in the pocket and having an inner surface in sliding engagement with the outer surface of the inner race, the wedge further having an outer surface that is ramped with respect to the inner surface of the wedge, wherein circumferential movement of the wedge relative to the pocket wedges the wedge into a narrowing portion of the gap to lock the inner race with the outer race;
    wherein the wedge includes a curved engagement surface at one circumferential end thereof and a narrowed toe at another circumferential end thereof, and the pocket defines a curved wedge-receiving surface extending from the ramped surface of the pocket configured to receive the engagement surface of the wedge.

8. The wedge clutch of claim 7, wherein the outer surface of the inner race defines a groove, and the inner surface of the wedge defines a chamfer engaged with the inner race within the groove.

9. The wedge clutch of claim 7, wherein the wedge is slideable relative to the outer race between a locked position in which the toe is wedged within the narrowing portion of the gap and the engagement surface is spaced from the wedge-receiving surface, and an unlocked position in which the toe is unwedged and the engagement surface contacts the wedge-receiving surface.

10. The wedge clutch of claim 9, wherein contacting of the wedge receiving surface and the engagement surface pivots the wedge and forces the toe toward the outer race.

11. The wedge clutch of claim 7, further comprising a spring biasing the wedge into the narrowing portion of the gap to lock the inner race with the outer race.

12. The wedge clutch of claim 11, wherein a centrifugal force during rotation of the outer race presses the wedge against the spring.

13. A one-way clutch comprising:
    an inner race extending about an axis and having an outer surface;
    an outer race concentric with the inner race and having an inner surface defining a pocket, the pocket having a ramped surface facing the axis, the ramped surface angling toward the outer surface of the inner race along a circumferential direction, the pocket farther having a curved wedge-receiving surface at one circumferential end thereof; and a wedge segment disposed in the pocket, the wedge segment having a ramped outer surface in sliding engagement with the ramped surface of the pocket, the wedge segment further having a curved engagement surface at one circumferential end thereof and a toe at an opposite circumferential end from the curved engagement surface;

wherein the wedge segment is slidable along the outer race between:

- a locked position in which the curved engagement surface is spaced from the wedge-receiving surface, and the toe is wedged between and contacting both the ramped surface of the outer race and the outer surface of the inner race to lock the outer race to the inner race, and
- an unlocked position in which the engagement surface contacts the wedge-receiving surface and the toe is unwedged from between the ramped surface of the outer race and the outer surface of the inner race to unlock the outer race and inner race.

14. The one-way clutch of claim 13, wherein when in the unlocked position during rotation, the wedge-receiving surface and a centrifugal force forces the wedge segment to pivot with the toe being forced toward the outer race.

15. The one-way clutch of claim 13, further comprising a spring biased to force the wedge segment away from the wedge-receiving surface.

16. The one-way clutch of claim 15, wherein the spring has a first end coupled to the outer race and a second end coupled to the wedge segment.

17. The one-way clutch of claim 15, wherein the wedge segment and the pocket is one of a plurality of wedges and a plurality of pockets circumferentially arranged about the axis.

* * * * *